(12) United States Patent
Zhang et al.

(10) Patent No.: US 10,353,475 B2
(45) Date of Patent: Jul. 16, 2019

(54) AUTOMATED E-TRAN APPLICATION

(71) Applicant: Microsoft Technology Licensing, LLC, Redmond, WA (US)

(72) Inventors: Xiaoyi Zhang, Shoreline, WA (US); Harish Sripad Kulkarni, Redmond, WA (US); Meredith Morris, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 15/284,124

(22) Filed: Oct. 3, 2016

(65) Prior Publication Data
US 2018/0095539 A1 Apr. 5, 2018

(51) Int. Cl.
| G06F 3/00 | (2006.01) |
| G06F 3/01 | (2006.01) |
| G06F 17/00 | (2019.01) |
| G06F 17/21 | (2006.01) |
| G06F 17/27 | (2006.01) |
| G06K 9/00 | (2006.01) |
| G06K 9/42 | (2006.01) |
| G06F 3/023 | (2006.01) |
| G06F 3/03 | (2006.01) |

(52) U.S. Cl.
CPC ............ *G06F 3/017* (2013.01); *G06F 3/013* (2013.01); *G06F 3/0237* (2013.01); *G06F 3/0304* (2013.01); *G06K 9/0061* (2013.01); *G06K 9/00228* (2013.01); *G06K 9/00604* (2013.01); *G06K 9/42* (2013.01)

(58) Field of Classification Search
None
See application file for complete search history.

(56) References Cited

U.S. PATENT DOCUMENTS

| 8,775,975 B2 | 7/2014 | Karmarkar et al. |
| 9,244,528 B2 | 1/2016 | Cleveland et al. |

(Continued)

FOREIGN PATENT DOCUMENTS

WO 2015066332 A1 5/2015

OTHER PUBLICATIONS

Mollenbach, et al., "Single Stroke Gaze Gestures", In Proceedings of Extended Abstracts on Human Factors in Computing Systems, Apr. 4, 2009, pp. 4555-4560.

(Continued)

*Primary Examiner* — Ariel Mercado
(74) *Attorney, Agent, or Firm* — Drinker Biddle & Reath LLP

(57) ABSTRACT

Techniques for text entry using gestures are disclosed. As disclosed, a camera may capture a frame and the face of the user can be detected therein. Landmarks can be aligned to the face in the captured frame. A left eye image and a right eye image may be extracted from the captured frame. The left eye image and the right image each may be resized and compared to a calibration template. A direction of eye gaze may be determined based upon the comparison. A character or word may be predicted based upon the determination of the direction of eye gaze and a known configuration of an eye gaze board (e.g., an E-tran board). The predicted character or word can be included as a part of a text-based message.

20 Claims, 12 Drawing Sheets

(56) References Cited

U.S. PATENT DOCUMENTS

| | | | |
|---|---|---|---|
| 2005/0149229 A1* | 7/2005 | Doi | H04N 7/163 700/245 |
| 2006/0242607 A1 | 10/2006 | Hudson | |
| 2009/0196460 A1* | 8/2009 | Jakobs | G06F 3/013 382/103 |
| 2013/0183952 A1 | 7/2013 | Davis et al. | |
| 2014/0002341 A1 | 1/2014 | Nister et al. | |
| 2014/0098024 A1* | 4/2014 | Paek | G06F 3/04886 345/168 |
| 2014/0372390 A1* | 12/2014 | Matsuzawa | G06F 17/30274 707/693 |
| 2015/0268821 A1 | 9/2015 | Ramsby et al. | |
| 2015/0309569 A1* | 10/2015 | Kohlhoff | G06F 3/0482 345/156 |
| 2015/0373414 A1* | 12/2015 | Kinoshita | H04N 5/23216 386/282 |
| 2016/0062458 A1 | 3/2016 | Kristensson et al. | |
| 2016/0140417 A1* | 5/2016 | Kang | G06F 17/30247 345/661 |
| 2016/0143528 A1* | 5/2016 | Wilf | A61B 3/113 351/206 |
| 2016/0210503 A1* | 7/2016 | Yin | G06F 3/00 |
| 2016/0322082 A1* | 11/2016 | Davis | G06F 3/0482 |
| 2017/0308734 A1* | 10/2017 | Chalom | G06K 9/0061 |

OTHER PUBLICATIONS

Møllenbach, et al., "Single Gaze Gestures", In Proceedings of the Symposium on Eye-Tracking Research & Applications, Mar. 22, 2010, pp. 177-180.

Mackenzie, et al., "BlinkWrite: efficient text entry using eye blinks", In Proceedings of Universal Access in the Information Society, vol. 10, May 13, 2010, pp. 69-80.

Bee, et al., "Writing with Your Eye: A Dwell Time Free Writing System Adapted to the Nature of Human Eye Gaze", In Proceedings of the 4th IEEE tutorial and research workshop on Perception and Interactive Technologies for Speech-Based Systems: Perception in Multimodal Dialogue Systems, Jun. 16, 2008, pp. 111-122.

Luca, et al., "Look into my Eyes! Can you guess my Password?", In Proceedings of the 5th Symposium on Usable Privacy and Security, Jul. 15, 2009, 12 pages.

"OptiKey", Published on: Jan. 3, 2016, Available at: https://github.com/OptiKey/OptiKey/wiki.

Lutz, et al., "SMOOVS: Towards calibration-free text entry by gaze using smooth pursuit movements", In Journal of Eye Movement Research, vol. 8, Issue 1, Mar. 19, 2015, pp. 1-11.

Wobbrock, et al., "Longitudinal evaluation of discrete consecutive gaze gestures for text entry", In Proceedings of the symposium on Eye tracking research & applications, Mar. 26, 2008, pp. 11-18.

Krafka, et al., "Eye Tracking for Everyone", In Proceedings of the IEEE Conference on Computer Vision and Pattern Recognition, Jun. 26, 2016, 9 pages.

Timm, et al., "Accurate Eye Centre Localisation by Means of Gradients", In Proceedings of the Sixth International Conference on Computer Vision Theory and Applications, Mar. 5, 2011, 6 pages.

Agustin, Javier S., et al., 2009, "Low-cost Gaze Interaction: Ready to Deliver the Promises", In Conference on Human Factors in Computing (CHI), 4453-4458, http://doi.org/10.1145/1520340.1520682.

Anderson, Monica, 2015, "Technology Device Ownership: 2015", Retrieved Sep. 15, 2016 from http://www.pewinternet.org/2015/10/29/technology-device-ownership-2015/.

Becker, Gary, 1996, "Vocal Eyes Becker Communication System", Retrieved Sep. 15, 2016 from http://asonbecker.com/eye_communication.html.

Biswas, Pradipta, et al., 2011, "A new input system for disabled users involving eye gaze tracker and scanning interface", Journal of Assistive Technologies 5, 2: 58-66. http://doi.org/10.1108/17549451111149269.

Bradski, Gary, 2000, "The OpenCV Library", Doctor Dobbs Journal 25: 120-126.

Davies, Mark, 2008, "The Corpus of Contemporary American English: 520 million words, 1990-present", Retrieved from http://corpus.byu.edu/coca/.

Grauman, Kristen, et al., 2003, "Communication via eye blinks and eyebrow raises: Video-based human-computer interfaces", Universal Access in the Information Society 2, 4: 359-373. http://doi.org/10.1007/s10209-003-0062-x.

Hart, Sandra G., et al., 1988, "Development of NASA-TLX (Task Load Index): Results of Empirical and Theoretical Research", Advances in Psychology 52, C: 139-183. http://doi.org/10.1016/S0166-4115(08)62386-9.

Kane, Shaun K., et al, 2012, "What We Talk About: Designing a Context-Aware Communication Tool for People with Aphasia", In Proceedings of the 14th international ACM SIGACCESS conference on Computers and accessibility—ASSETS '12, 49. http://doi.org/10.1145/2384916.2384926.

Kazemi, Vahid, et al., 2014, "One millisecond face alignment with an ensemble of regression trees", In Proceedings of the IEEE Computer Society Conference on Computer Vision and Pattern Recognition, 1867-1874. http://doi.org/10.1109/CVPR.2014.241.

King, Davis E, 2009, "Dlib-ml: A Machine Learning Toolkit", Journal of Machine Learning Research 10: 1755-1758.

Krafka, Kyle, et al., 2016, "Eye tracking for Everyone", In IEEE Conference on Computer Vision and Pattern Recognition (CVPR).

Kristensson, Per Ola, et al., 2012, "The potential of dwell-free eye-typing for fast assistive gaze communication", In Proceedings of the Symposium on Eye Tracking Research and Applications, 241-244. http://doi.org/10.1145/2168556.2168605.

Briandais, Rene De La, 1959, "File searching using variable length keys", In Papers presented at the western joint computer conference, 295-298.

Lankford, Chris, 2000, "Effective eye-gaze input into windows", In Proceedings of the 2000 Symposium on Eye Tracking Research & Applications, 23-27. http://doi.org/10.1145/355017.355021.

Lehmann, Erich Leo, et al., 2006, "Theory of point estimation", Springer Science & Business Media.

Low Tech Solutions, 2016, E-tran Board. Retrieved Sep. 15, 2016 from http://store.lowtechsolutions.org/e-tran-board/.

LusoVu. 2016. EyeSpeak. Retrieved Sep. 15, 2016 from ht tp://www.myeyespeak.com/eyespeak/.

Mackenzie, Scott, et al., 2003, "Phrase sets for evaluating text entry techniques", In CHI '03 Extended Abstracts on Human Factors in Computing Systems, 754-755. http://doi.org/10.1145/765968.765971.

Majaranta, Paivi, et al., 2009, "Fast gaze typing with an adjustable dwell time", In Proceedings of the 27th international conference on Human factors in computing systems—CHI 09, 357. http://doi.org/10.1145/1518701.1518758.

Microsoft Research, 2016, "Hands-Free Keyboard", Retrieved Sep. 15, 2016 from https://www.microsoft.com/en-us/research/project/hands-free-keyboard/.

Nowlan, Steven, et al., 2001, "Data entry apparatus having a limited number of character keys and method", Retrieved from https://www.google.com/patents/US6204848.

Nuance. 2016. T9 Text Input. Retrieved Sep. 15, 2016 from ht tp://www.nuance.com/for-business/by-product/t9/index.htm.

Papoutsaki, Alexandra, et al., 2016, "WebGazer: Scalable Webcam Eye Tracking Using User Interactions", In Proceedings of the 25th International Joint Conference on Artificial Intelligence, 3839-3845.

Swift, Sarah Marie, 2012, "Low-Tech, Eye-Movement-Accessible AAC and Typical Adults".

The ALS Association. 2016. Facts You Should Know. Retrieved Sep. 15, 2016 from http://www.alsa.org/about-als/facts-you-should-know.html.

TheEyeTribe. 2016. The Eye Tribe. Retrieved Sep. 15, 2016 from https://theeyetribe.com/.

Tobii. 2016. Tobii Dynavox Webshop. Retrieved Sep. 15, 2016 from https://www.tobiiati-webshop.com/.

Tobii. 2016. Communicator 5—Tobii Dynavox. Retrieved Sep. 15, 2016 from http://www.tobiidynavox.com/communicator5/.

(56) References Cited

OTHER PUBLICATIONS

Tobii. 2016. Sono Lexis—Tobii Dynavox. Retrieved Sep. 15, 2016 from http://www.tobiidynavox.com/sono-lexis/.

Vaitukaitis, Vytautas, et al., 2012, "Eye gesture recognition on portable devices", In Proceedings of the 2012 ACM Conference on Ubiquitous Computing—UbiComp '12, 711. http://doi.org/10.1145/2370216.2370370.

Vitter, David, 2015. "S.768—Steve Gleason Act of 2015", Retrieved Sep. 15, 2016 from https://www.congress.gov/bill/114th-congress/senate-bill/768.

Wang, Zhou, et al., 2004, "Image quality assessment: From error visibility to structural similarity", IEEE Transactions o n Image Processing 13, 4: 600-612. http://doi.org/10.1109/TIP.2003.819861.

Ward, David J., et al., 2002, "Dasher: A Gesture-Driven Data Entry Interface for Mobile Computing", Human-Computer Interaction 17, 2/3: 199-228.

Watman, Craig, et al., 2004, "Fast sum of absolute differences visual landmark detector", In IEEE International Conference on Robotics a nd Automation, 2004. Proceedings. ICRA '04. 2004, 4827-4832 vol. 5. http://doi.org/10.1109/ROBOT.2004.1302482.

Wobbrock, Jacob O., et al., 2011, "Ability-Based Design: Concept, Principles and Examples", ACM Transactions on Accessible Computing 3, 3: 1-27. http://doi.org/10.1145/1952383.1952384.

Wobbrock, Jacob O., et al., 2008, "Longitudinal evaluation of discrete consecutive gaze gestures for text entry", In Proceedings of the 2008 symposium on E ye tracking re search & applications, 11. http://doi.org/10.1145/1344471.13/14175.

Biswas, Pradipta, et al., "A New Interaction Technique Involving Eye Gaze Tracker and Scanning System", Proceedings of Eye Tracking South Africa, Cape Town, Aug. 29-31, 2013, pp. 67-70.

\* cited by examiner

AUTOMATED E-TRAN APPLICATION

FIELD OF THE DISCLOSURE

The present disclosure relates generally to techniques for low-cost, portable, and robust eye gesture communication system and more particularly, to an eye gaze board application.

BACKGROUND

Eye gaze boards (also known as eye transfer boards or E-tran boards) or eye gaze keyboards (e.g., a digital keyboard) are a common communication solution for people with Amyotrophic Lateral Sclerosis (ALS), or who otherwise have very limited movement but have volitional eye movements. ALS is a neurodegenerative disease that causes atrophy of motor neurons leading to the loss of muscle movement. The muscles that control eye movement are usually spared until the final stages of the disease. Thus, eye gaze boards enable communication for individuals with ALS or the like until the late stages of the disease.

High technology gaze recognition systems can also be dwell-based systems (i.e., the user dwells their gaze on a key for a period, typically several hundred milliseconds, in order to select the key). Specialized hardware set-ups can be used in eye gaze tracking systems such as head-mounted eye trackers that keep the eyes and the camera close and relatively static during head movement. Still other high-tech systems can mount a camera on a computer monitor and find pupil locations based on reflections. Unfortunately, these and other high-tech eye gaze keyboards have several problems: (1) the hardware for commercial gaze-operated keyboards is relatively expensive ($500~$3,000 U.S. dollars); (2) the eye tracker requires calibration before each use; (3) the eye tracker does not work in certain conditions that interfere with infrared light, such as outdoors; and (4) the system requires a stand to keep it relatively static with respect to the patient, which makes it difficult to use in certain situations such as in a car or in bed. Notably, there are no eye trackers for a mobile device, and no eye trackers that are integrated into a mobile device.

Eye-gaze transfer ("E-tran") boards are an alternative, low-tech solution to the commercial gaze-operated keyboards. An E-tran board typically is printed on a transparent plastic board. A typical configuration for an E-tran board has, for example, 8 quadrants spaced around a hole in the center of the board. Each quadrant has, for example, six letters in it. A communication partner holds up the board to face the patient (e.g., a person with ALS) while the communication partner observes the patient through the hole in the center of the board. A person with ALS can communicate using an E-tran board by focusing gaze on selected characters on a translucent board, and a communication partner (e.g., a caregiver or an interpreter) interprets the gaze. Selection of a letter, for example, is performed by two gazes. The first gaze indicates the quadrant, and the second gaze indicates the position of the letter within the indicated quadrant. The communication partner interprets each eye-gaze and can confirm the patient's selection for each eye-gaze (e.g., by having the patient blink or stare at the center of the board). Other low-tech systems rely upon the user (e.g., individual with ALS) having the ability to move a mouse, for example, or lack calibration to a particular device, user, and/or lighting condition.

E-tran boards have several drawbacks: (1) their cost is relatively low compared to gaze-tracking systems, but is not negligible (~100 U.S. dollars); (2) the large plastic board (e.g., ~35 cm by ~45 cm) is not easily portable; (3) patients need to perform two eye gazes to enter one character, which can require more than 8 seconds including additional time to correct any mistakes; and (4) are challenging to master. Communication partners find gaze interpretation has a high learning curve, as they have to decode and remember entered characters and predict words. Furthermore, they provide relatively slow communication rates.

Thus, current eye-tracking input systems for people with ALS or other motor impairments are expensive, not robust under various light conditions (e.g., in sunlight or low light), and require frequent re-calibration and substantial, relatively immobile setups.

SUMMARY

According to an embodiment, a system for entering text using an E-tran board is disclosed that includes a camera, a database, and a processor. The camera may capture one or more frames that include a face of a user. The database may be configured to store the one or more frames from the camera. The processor may be communicatively coupled to the camera and the database. The processor configured to detect a face in the captured one or more frames and align landmarks to the face in the captured one or more frames. The processor may be configured to extract a left eye image and a right eye image of the face from the captured one or more frames. The extraction may be based upon the landmarks aligned to the one or more frames. The left eye image may be resized to a size matching one of a calibrated set of left eye images and the right eye image may be resized to a size matching one of a calibrated set of right eye images. The resized images and/or a given calibrated may be at least 30 pixels by at least 15 pixels in size. The processor may be configured to compare the resized left eye image to a calibrated set of left eye images for the user. Each image in the calibrated set of left eye images may correspond to a known eye gaze direction for a left eye of the user. The processor may be configured to compare the resized right eye image to a calibrated set of right eye images for the user. Each image in the calibrated set of right eye images may correspond to a known eye gaze direction for a right eye of the user. In some configurations, the processor may convert the left eye image to hue, saturation, and value (HSV) color space and retain only the value portion. Similarly, it may convert the right eye image to HSV color space and retain only the value portion.

The processor may determine a direction of eye gaze based upon the comparison of the resized left eye image to the calibrated set of images for the left eye and the comparison of the resized right eye image to the calibrated set of images for the right eye. A character may be predicted based upon the determination of the direction of eye gaze and a known configuration of an eye gaze board (e.g., an E-tran board or keyboard). The predicted character may be included as a part of a text-based message. The processor may be configured to receive one or more eye gazes from the user to form a sequence of eye gazes. Each eye gaze may correspond to a quadrant of an E-tran board containing a group of characters. The processor may be configured to predict a word based upon the sequence of eye gazes.

In some instances, the processor may determine at least one word associated with the predicted character based upon the predicted character. The processor may receive a selection of at least one word associated with the predicted character. The processor may be configured to cause an audible or visible indication of the predicted character and/or word. In some instances the processor may be configured to receive a gesture from the user and perform an action based upon the gesture. In some configurations, the action may be to delete the predicted character from the text-based message.

In some configurations, the processor may be configured to generate the calibration template that includes the calibrated set of left eye images and the calibrated set of right eye images. The processor may receive an indication of eye gaze of the user in a direction. It may receive a second at least one frame of the user from the camera. The processor may be configured to detect the face of the user in the second at least one frame. Landmarks may be aligned to the face in the captured second at least one frame. The processor may extract a calibrated left eye image and a calibrated right eye image of the face from the second at least one frame. In some configurations, landmarks may be aligned to the face to improve the accuracy of the system. In some configurations, the calibrated left eye image may be resized to a standard size such as 80 pixels by 40 pixels) and be at least 30 pixels by at least 15 pixels. Similar parameters may be applied to the calibrated right eye image (e.g., it may be resized to at least 30 pixels by at least 15 pixels). The calibrated left eye image and the calibrated right eye image may be stored to the database as part of the calibration template for the direction of eye gaze.

In some configurations the processor may determine the lighting condition the user is in based upon the amount of light detected by the camera. The lighting condition may be associated with the calibration template.

According to an embodiment, a computer-implemented method is disclosed. A camera may capture at least one frame that includes a user's face. The face of the user can be detected in the captured at least one frame. Landmarks can be aligned to the face in the captured at least one frame by the processor. A left eye image and a right eye image of the face may be extracted from the at least one frame. The extraction may utilize the aligned landmarks to extract the left eye image and/or the right image to improve the accuracy of eye detection. The left eye image and the right image may each be resized to a size matching one of a set of calibrated left eye and/or right eye images. The set of calibrated left eye and/or set of calibrated right eye images may have a standard size such as 80 pixels by 40 pixels. The size of the calibrated image is not limiting so long as it is at least 30 pixels by at least 15 pixels. The resized left eye image can be compared to a calibrated set of left eye images for the user. Each image in the calibrated set of left eye images may correspond to a known eye gaze direction for a left eye of the user. The resized right eye image may be compared to a calibrated set of right eye images for the user. Each image in the calibrated set of right eye images may correspond to a known eye gaze direction for a right eye of the user. In some configurations, the left eye image may be converted to hue, saturation, and value (HSV) color space and retain only the value portion. Similarly, the right eye image may be converted to HSV color space and retain only the value portion.

A direction of eye gaze may be determined based upon the comparison of the resized left eye image to the calibrated set of images for the left eye and the comparison of the resized right eye image to the calibrated set of images for the right eye. A character may be predicted based upon the determination of the direction of eye gaze and a known configuration of an eye gaze board (e.g., an E-tran board). The predicted character can be included as a part of a text-based message. One or more eye gazes may be received from the user to form a sequence of eye gazes. Each eye gaze may correspond to a quadrant of an E-tran board containing a group of characters. A word may be predicted based upon the sequence of eye gazes.

In some instances, at least one word associated with the predicted character may be determined based upon the predicted character and/or any preceding predicted characters. A selection of at least one word associated with the predicted character may be received. An audible or visible indication of the predicted character and/or word may be provided. In some instances, a gesture from the user may be received and an action may be performed based upon the gesture. In some configurations, the action may be to delete the predicted character from the text-based message.

In an implementation, a calibration template may be generated. The calibration template may include a calibrated set of left eye images and right eye images. An indication of eye gaze of the user in a direction may be received. A second at least one frame of the user may be captured. The face of the user in the second at least one frame may be detected. Landmarks may be aligned to the captured second at least one frame. A calibrated left eye image and a calibrated right eye image of the face may be extracted from the second at least one frame. In some configurations, the extraction may be based upon the landmarks aligned to the detected face. The calibrated left eye image may be resized to at least 30 pixels by at least 15 pixels (including a size such as 80 pixels by 40 pixels) and the calibrated right eye image may be resized to at least 30 pixels by at least 15 pixels (including a size such as 80 pixels by 40 pixels). The calibrated left eye image and the calibration right eye image may be stored as part of the calibration template for the direction of eye gaze.

In some configurations the lighting condition the user is in may be determined based upon the amount of light detected by the camera. The lighting condition may be associated with the calibration template.

According to an embodiment, a non-transitory computer readable medium having stored thereon computer readable instructions that are executable to cause one or more processors to perform operations is provided. A camera may capture at least one frame that includes a user's face. The face of the user can be detected in the captured at least one frame. Landmarks can be aligned to the face in the captured at least one frame by the processor. A left eye image and a right eye image of the face may be extracted from the at least one frame. In some configurations, the extraction may be based upon the landmarks aligned to the face. The left eye image and the right image may each be resized to a size matching a calibrated image size (i.e., at least 30 pixels by at least 15 pixels, including a standard size of 80 pixels by 40 pixels). The resized left eye image can be compared to a calibrated set of left eye images for the user. Each image in the calibrated set of left eye images may correspond to a known eye gaze direction for a left eye of the user. The resized right eye image may be compared to a calibrated set of right eye images for the user. Each image in the calibrated set of right eye images may correspond to a known eye gaze direction for a right eye of the user.

Based upon the executable instructions, a direction of eye gaze may be determined based upon the comparison of the resized left eye image to the calibrated set of images for the left eye and the comparison of the resized right eye image to the calibrated set of images for the right eye. A character may be predicted based upon the determination of the direction of eye gaze and a known configuration of an eye gaze board (e.g., an E-tran board). The predicted character can be included as a part of a text-based message.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Disclosed is a low-cost, portable, and robust eye gesture or eye gaze-based communication system for individuals with ALS that is relatively easy for users (e.g., patients) and communication partners to use. As an example, the disclosed implementations can be performed on a mobile device to capture eye gaze gestures and interpret them as characters using computer vision techniques. The system is as portable as a mobile phone, or other electronic device such as a tablet or laptop. Furthermore, users can perform a single eye gesture to enter a character instead of the two gestures required of conventional E-tran boards. An eye gesture may refer to an eye gaze in a particular direction, closed eye(s), an eye wink, The system can record the entered character(s) to automatically predict a word. Compared to commercial eye gaze trackers, the disclosed system (1) has no additional cost other than a device such as a smartphone, which most people already own; (2) it only needs a one-time calibration; and (3) it does not require a bulky stand, as a communication partner can hold the phone. In addition, the system has the ability to account for different lighting conditions for which conventional eye tracking systems are unaffordable or impractical. Thus, the disclosed system is relatively low-cost, portable, easy-to-learn, and robust, and it has a relatively higher communication throughput as compared to a conventional plastic E-tran board.

Figure 1A:
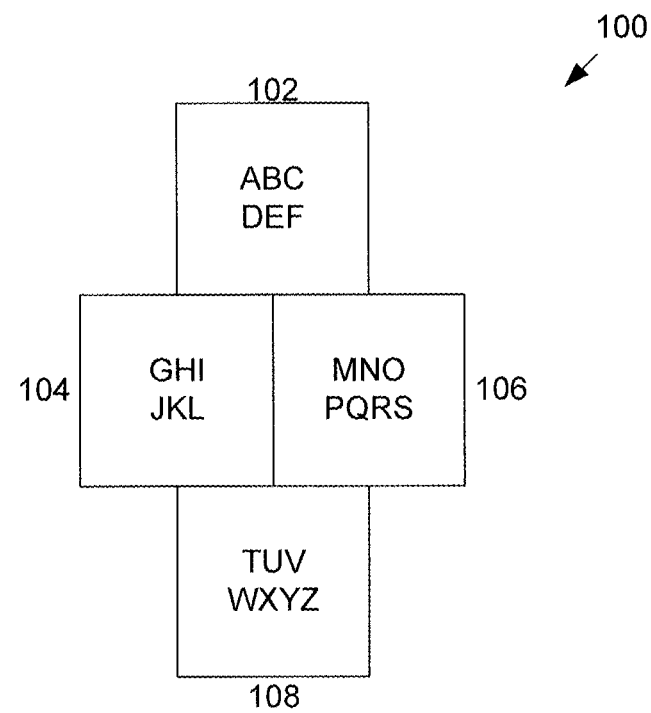
FIG. 1A is an example of an eye gaze board according to a disclosed implementation.
Figure 1B:
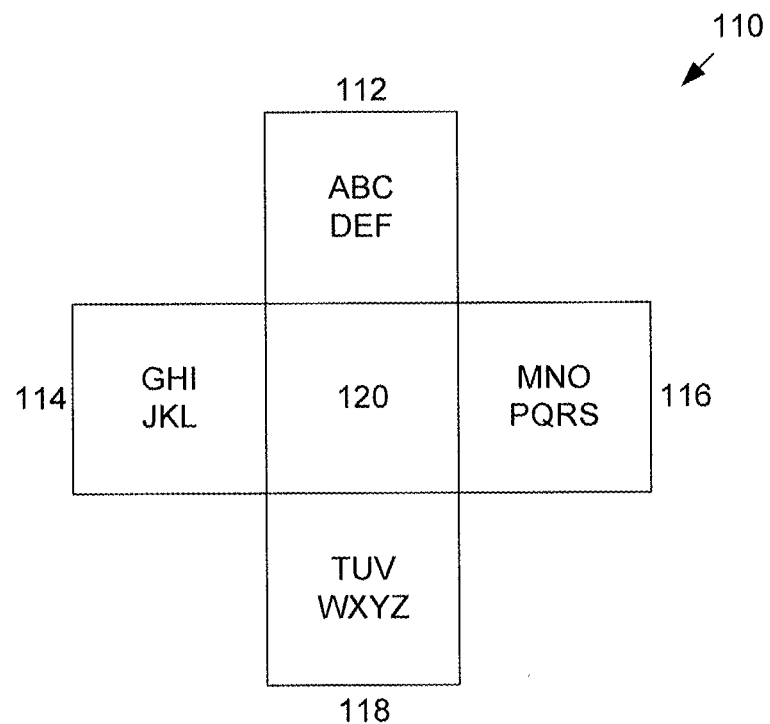
FIG. 1B is an example of an eye gaze board according to a disclosed implementation that has a different configuration than the eye gaze board illustrated in FIG. 1A.

An example of an eye gaze board 100 is illustrated in FIG. 1A. The example eye gaze board 100 contains four quadrants 102, 104, 106, 108, each of which contains a grouping of letters. The implementations of the present application are not limited to the configuration of the eye gaze board 100 shown in FIG. 1A. The number of quadrants may be varied to include more or less quadrants than four, and the content of each quadrant can be altered to suit a particular user or to include additional/different content. For example, a quadrant may include "Yes" while another quadrant may include "No." As another example, a quadrant may include a series of numbers. In still another example, the displayed eye gaze board 100 may include a blank space or a hole in the center and have other quadrants distributed around the center space. FIG. 1B is an example of an electronically-represented eye gaze board 110 according to a disclosed implementation that has a different configuration than the eye gaze board illustrated in FIG. 1A 100. The eye gaze board of FIG. 1B 110 has four quadrants with letters 112, 114, 116, 118, as well as a blank space in the middle 120. As previously stated, the number of quadrants and content thereof can be varied to suit a particular user's preferences or situation.

The eye gaze board 100 can be printed out and taped to the back of a smartphone (or other electronic device), for example. As another example, it can be displayed electronically to the user on the electronic device or through the use of a second device that includes a screen (e.g., a monitor, a second smartphone, a tablet, a laptop, etc.). Because the configuration of the eye gaze board 100 can be customized, the system may have a default configuration such as the example provided in FIG. 1A, or it may request a user or communication partner to indicate the number of quadrants and the content of each respective quadrant. The configuration can be stored to the device, and loaded upon request such that the system utilizes the loaded eye gaze board configuration and performs analysis of eye gestures based upon the E-tran board configuration. Thus, the system may receive an indication of the configuration of the E-tran board 100 so that it can predict a character and/or word based upon the E-tran board 100 configuration.

Figure 2:
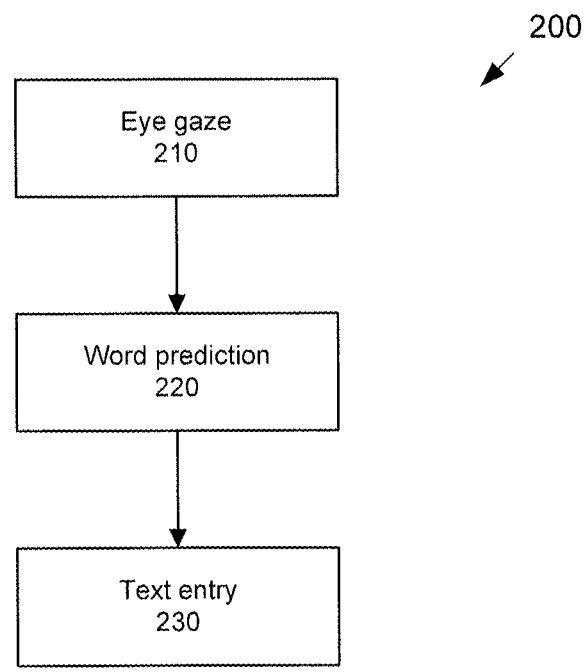
FIG. 2 is an example overview of the three features of the disclosed implementations herein including: eye gaze recognition, text prediction, and a text entry interface.

FIG. 2 is an example overview 200 of the three features of the present system, including: eye gesture or eye gaze recognition 210, text prediction 220, and a text entry interface 230, that provides feedback to the user (e.g., a person with ALS) and/or the communication partner. The system can include an algorithm to robustly recognize eye gestures of a user in real time on a hand-held smartphone or other electronic device, and decode these gestures into predicted utterances. The system can include a user interface to facilitate the user's and communication partner's roles.

Beginning with eye gaze recognition at block 210 in FIG. 2, the system can robustly recognize eye gestures for both eyes. For example, the system can recognize: look up, look down, look left, look right, look center, and close eyes. Additional gestures can be included as needed, such as where the E-tran board includes more than four quadrants. For example, the system can detect directions that are diagonal to up and right, up and left, down and right, and down and left. If the user can wink (e.g., closing only one eye at a time), the system can also associate winking the left eye or the right eye with a particular function. Thus, the system can receive a gesture and, based on the gesture, perform an action. The action may include, deleting a character or word, confirming a character or word, indicating the end of a sentence, and/or manipulating other elements of the user interface. For example, the gesture recognition may allow a user to control various elements of the operating system or user interface (e.g., close window, go back on a web browser, open a new document, launch an application, close an application, etc.).

Before the system can be used for eye gaze detection 210 as described above with respect to FIG. 2, the system can be calibrated to a particular user. Each user likely has unique facial features and/or capabilities; thus, the calibration process can allow the system to detect the eye gestures for a particular user. The system can collect a set of eye gestures from the user as calibration templates. As an example, a communication partner can hold a phone with a rear camera facing the user and press a "calibrate" button that appears on the screen of the phone as part of the user interface for the disclosed system. The phone (or other device) can emit an audio or visual cue to indicate to the user to prepare for the calibration process. The system may then instruct the user to, for example, look up, down, left, right, center, and to close both eyes. As mentioned earlier, the number of directions may be customized based upon the number of quadrants and/or gestures desired. If the system utilizes fewer quadrants, then it may only instruct the user to look in fewer directions. Similarly, if the system utilizes more quadrants, then it may request the user to look in more directions, such as look up and right, look up and left, look down and left, and look down and right. A "set" of calibrated images may refer to the collection of images for each direction that can be collected during the calibration process as disclosed herein. Generally, the template matching will be more accurate the more distinct the eye gazes are from each other.

The calibration sequence can be performed in approximately ten seconds. Calibration is only required the first time the disclosed application is operated, or if lighting conditions vary drastically. Calibrations taken under different circumstances can be stored, labeled, and loaded or selected as needed, and even transferred between different devices.

Figure 3A:
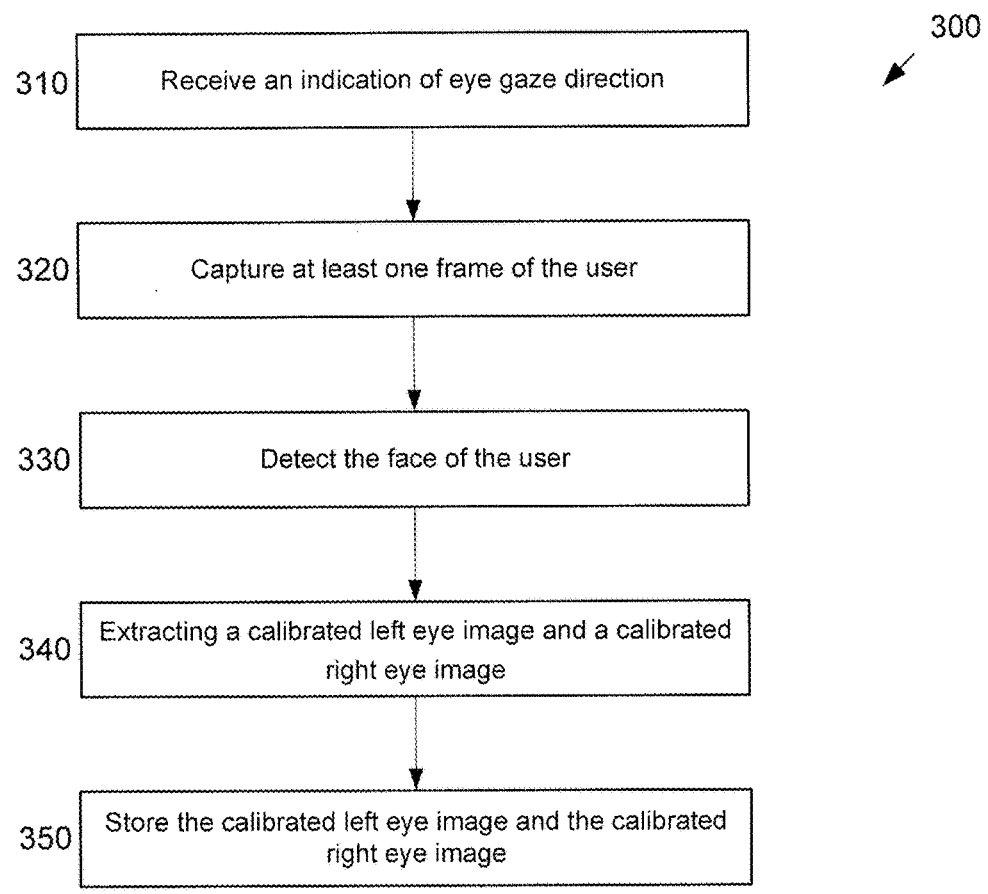
FIG. 3A is an example of the calibration process according to an implementation disclosed herein.

An example of the calibration process 300 is illustrated in FIG. 3A. To obtain a calibration template for eye gaze recognition, the system may begin by requesting the user to indicate or specify the configuration of the E-tran board that is to be used with the system. Based upon the received indication, the system may determine the number of eye gaze directions that are possible. For example, the example E-tran board 100 shown in FIG. 1A may specify six possible eye gaze directions. The system, therefore, may have preconfigured E-tran boards from which a user or communication partner may make a selection, as well as provide for customized E-tran boards. For a customized E-tran board, the system may request the user to specify one or more of the number of quadrants, capabilities of the user (e.g., can the user perform a wink gesture), and/or the number of directions that the customized E-tran board will employ. The indication of the E-tran board configuration may be stored in a non-transitory computer readable memory.

The calibration process may be initiated by a communication partner pressing a button in the user interface (e.g., "calibrate"). The disclosed system may face a camera of the electronic device towards the user and the system may provide a series of audible instructions to the user. Upon initiating the calibration process, the system may direct the user to perform a sequence of eye gazes in specific directions (e.g., left, right, up, down, center, closed) corresponding to the particular E-tran board or number of directions/gestures specified. A three quadrant E-tran board may follow a sequence of up, left, right, center, and closed, while a four quadrant E-tran board left, right, up, down, center, closed. The system can associate a particular eye gaze with a particular direction or gesture during the process by matching the known sequence with the captured one or more images following instruction to perform a particular eye gaze or gesture. In general, for the purpose of calibration, the robustness of the template matching can be improved by directing the user to make eye gestures that exaggerated such that each direction of gaze is distinct from each other. At 310, the system may receive an indication of an eye gaze direction. For example, the system may receive an indication that the first direction to be calibrated is the "up" direction. The system may audibly indicate to the user to look up by stating "look up" using a speaker, for example. As another example, the system may visually direct the user to look in a particular direction such as by displaying on a screen an arrow pointing in the up direction.

At least one frame of the user may be captured at 320. As described above a camera that faces the user may capture one or more frames of the user subsequent to directing the user to look in a specified direction. The frames may be stored to computer readable memory. The speed at which the user is instructed to perform the next eye gesture by the system can be manually controlled by the communication partner (e.g., the communication partner can direct the system to proceed to the next gesture), and/or be varied based upon the physical capabilities of the user. Next, a face is detected in the frame(s) captured by the camera at 330. Face detection algorithms are well known to those of ordinary skill in the art and implementations disclosed herein are not limited to a particular face detection algorithm. As an example, the face detection algorithm may define a rectangle that contains the user's face.

At step 340, a calibrated image may be extracted for each eye of the user. A left eye and/or right eye image can be extracted from the face detected in a captured image using, for example, a cascade classifier such as a Haar feature-based cascade classifier. Other classifiers or algorithms may be used to detect an eye. In some configurations, landmarks may be aligned to the detected face in the captured at least one frame. A landmark, for example, may be a user's nose, mouth, eyes, contour of the face, etc. The alignment, for example, may identify the contours of the face corresponding to the eye. The system may determine a bounding rectangle of eye landmarks (e.g., as indicated by the facial contours). For example, a bounding rectangle for each eye may be extracted (e.g., one bounding rectangle per eye). Thus, landmarks do not need to be aligned to the detected face to extract an eye image. Landmarks can improve the accuracy of the system in recognizing an eye gesture.

In some configurations, the calibrated left eye image and/or calibrated right eye image may be resized to an identical size such as 80 pixels by 40 pixels. The disclosed implementations provide accurate eye gesture recognition with extracted image sizes and/or calibrated image sizes of at least 30 pixels by 15 pixels (i.e., each extracted eye image or calibrated image is at least 30 pixels by at least 15 pixels). Image sizes below this size decrease the accuracy of the system to detect a direction of eye gaze. Similarly, if the image size is too large, it can slow processing of the calibration template or detection of eye gaze when the system is used to predict a character and/or word for a user. Generally, for most uses, image size greater than 500 pixels by 500 pixels does not improve the accuracy of the disclosed system. In addition, to improve the accuracy of the eye gaze detection, the image can be converted to hue, saturation, and value ("HSV") color space, and only the brightness value (i.e., the V channel) can be stored. In some configurations, the image can be converted to a gray scale image or a single channel from an RGB image.

The extracted images may be separately processed for step 350. At step 350, the calibrated image for each eye for the eye gaze direction indicated at step 310 can be stored to computer readable memory. The calibrated left eye image and calibrated right eye image may be labeled to indicate the eye (i.e., left/right) and/or gesture (i.e., up, down, left, right, center, and closed).

Figure 3B:
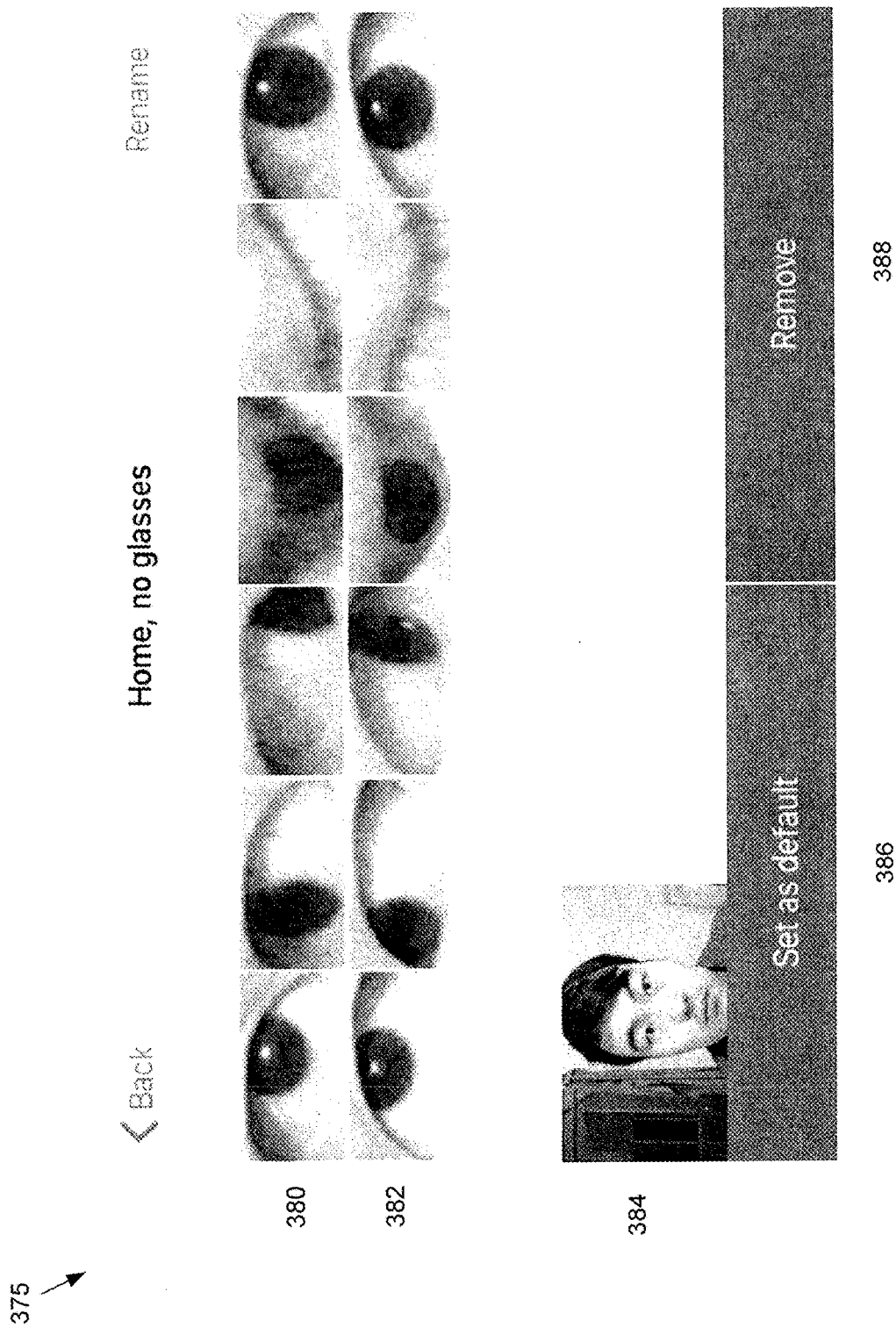
FIG. 3B is an example of the user interface associated with the calibration process and examples of the calibration templates for specific eye gestures according to an implementation disclosed herein.

FIG. 3B is an example of the user interface 375 associated with the calibration process and examples of the calibration templates for specific eye gestures for the left eye 380 and the right eye 382. In some instances, when a user looks down, eyelashes may cover the user's eyes. Thus, for the look down gesture, users can be instructed to keep eyes as wide open as possible while looking down. As shown in FIG. 3B, the user interface may show the entire frame within view of the camera 384, which in this example primarily contains the face of the user. In addition, the user interface may allow a user to store the template 386 or remove 388 the template. The template may be associated with a particular location and setting as well such as "Home" and "no glasses."

Figure 4:
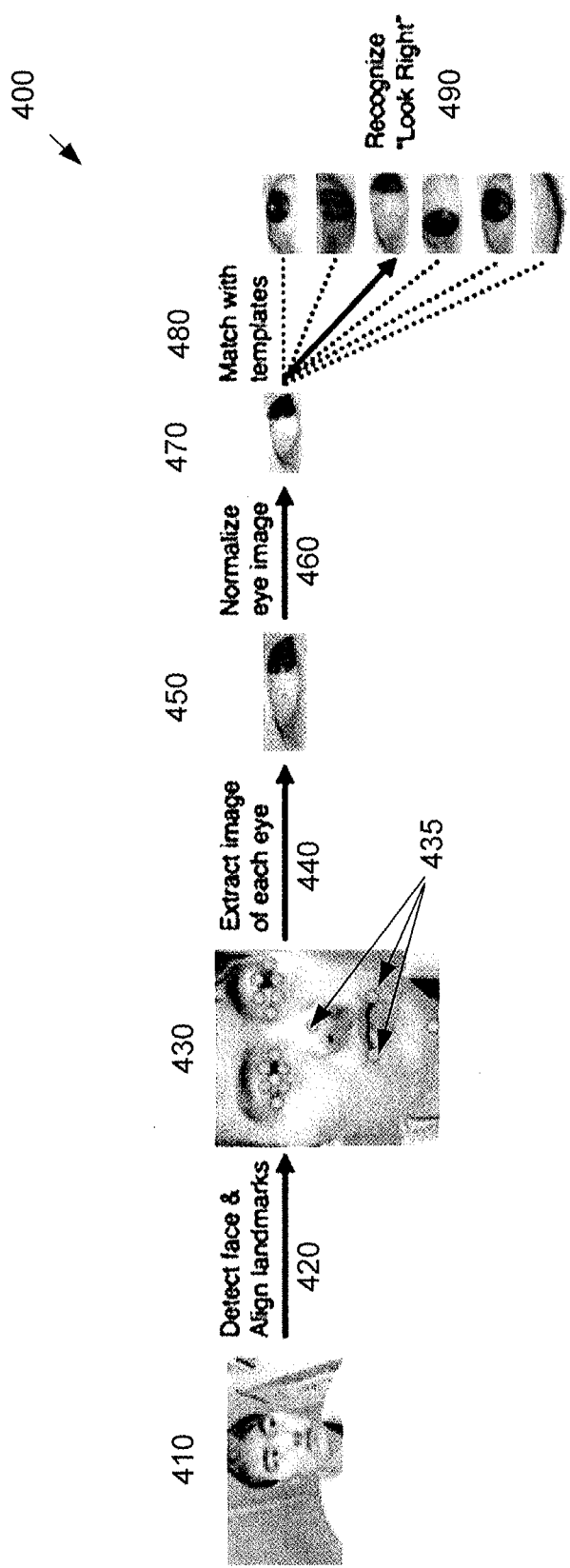
FIG. 4 is an example of the eye gaze detection as applied to a user according to a disclosed implementation.

Turning now to the recognition algorithm of the instant application, FIG. 4 is an example of the eye gaze detection as applied to a user 400. Beginning at 410, a user's face is captured by a camera. The camera can be, for example, the rear camera or front camera of a smartphone or tablet, a peripheral camera, etc. The user may have view of an E-tran board. The configuration of the E-tran board may be indicated to the system. The selected E-tran board may be printed out, or it may be displayed on a screen that is in view of the user. A communication partner may indicate to the system to prepare to generate a text-based message. The user, at 410 may glance in a particular direction associated with a character in a quadrant of an E-tran board. The image at 410 is an example of a frame captured of a user's face. At 420, the user's face may be detected. In some configurations, landmarks may be aligned to the detected face. The image shown at 430 is an example of the user's detected face, with dots 435 indicating the alignment of landmarks to the user's face (e.g., eyes, nose, chin, and mouth). The system can determine the orientation of the user's face based upon the landmarks and, therefore, can determine whether an image corresponds to the left eye or right eye. As stated previously, an eye can be extracted from a captured image without aligning landmarks.

An image of each of the user's eyes is extracted at 440 as described above. An example of an extracted image for one of the user's eyes is shown in the image at 450. In this example, a rectangle that includes the six landmarks, as indicated by the dots 435 surrounding one of the user's eyes, can be extracted. At 460, the extracted image at 450 can be normalized by resizing it to a size of at least 30 pixels by 15 pixels. For example, normalizing the extracted image may refer to resizing the extracted image to a size matching the size of one of the calibrated set of left eye images and/or right eye images. The calibrated images may each be the same size. In some instances, the image can be converted to HSV color space as described above to improve the accuracy of the disclosed embodiments. The image shown at 470 is an example of the normalized image for one of the user's eyes for the eye gaze at 410. At 480, the normalized eye image of 470 can be matched to a set of calibrated images for the left or right eye. For example, if the images at 450 and 470 correspond to the right eye, the system may compare the normalized right eye image to the calibration templates for the right eye.

Once there is a new or existing calibration for the user, the user may perforin eye gestures to communicate while a communication partner, for example, aims the rear phone camera towards the user. In some configurations, the user's face may be displayed on the screen of the phone (which can face the communication partner). For each camera frame, the disclosed system can detect the face, extract an image of each eye, and normalizes the eye image. Then the system can classify eye gestures by matching the normalized eye images extracted from the current video frame with the calibration templates.

The images shown at 490 correspond to examples of the calibration templates for one of the user's eyes. In order from top to bottom, the calibrated set of images at 490 correspond to up, down, left, right, center, and closed in this example for a given eye. The system compares the normalized eye image of 470 to each of the calibrated set of images at 490 to determine which of the calibration images most closely resembles the eye gaze direction of the normalized image 470. Many image comparison algorithms are known, and the presently disclosed implementations are not limited to a particular image comparison algorithm. Because each calibrated template image is associated with a particular eye gaze direction (e.g., up, down, left, right, center, and closed), when a match is determined, the user's direction of eye gaze can be determined. Based on the E-tran board configuration, the system may determine that that the user has indicated a particular character in a quadrant of the E-tran board that is in the direction of the eye gaze.

Figure 5:
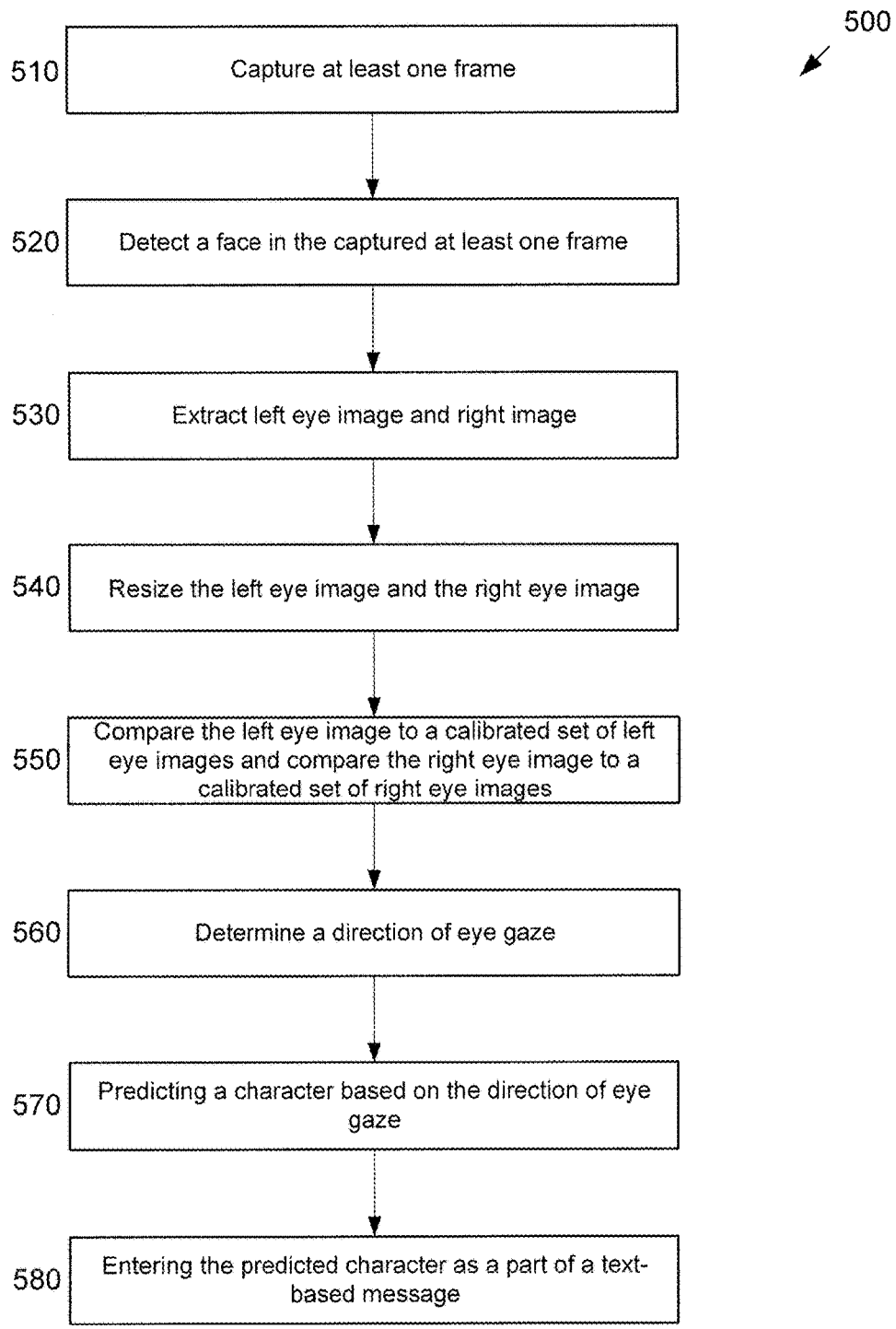
FIG. 5 is an example of the process for entering a character in a text-based message based upon a direction of a user's eye gaze relative to an E-tran board according to an implementation disclosed herein.

FIG. 5 is an example of the process for entering a character in a text-based message 500 based upon a direction of a user's eye gaze relative to an E-tran board. At 510, at least one frame of a user who can view an E-tran board is captured. The camera can be positioned such that the face of the user is in the frame captured by the camera. As previously described, the configuration of the E-tran board may be previously indicated and/or entered by a communication partner. At 520, a face in the captured at least one frame may be detected using a face detection algorithm as described above. A left eye image can be extracted and a right eye image can be extracted 530. Landmarks can be aligned to the detected face in the captured at least one image in some configurations to improve the accuracy of the eye gesture recognition. As described above, the extracted eye images can be resized to a size matching one of a set of calibrated left eye and/or calibrated right eye images. As described above, the minimum size for an extracted image and/or calibrated image can be at least 30 pixels by at least 15 pixels at 540. The calibrated images for the left eye and right eye may be identically sized to, for example, 80 pixels by 40 pixels. Each extracted image in such a case may also be resized to 80 pixels to 40 pixels.

The resized left eye image can be compared to a calibrated set of left eye images, and similarly, the resized right eye image can be compared to a calibrated set of right eye images at 550. As an example, mean squared error ("MSE") can be computed to measure the difference between two images. MSE can be used to determine the closest match for the normalized eye images from step 540 to the calibration template that includes the set of calibrated images for each eye. Other algorithms may be utilized to perform the image comparison such as structural similarity and/or sum of absolute differences.

At 560, a direction of eye gaze can be determined based upon the set of calibration images that match the normalized image obtained at 540. Based upon the direction of eye gaze determined at 560, a character may be predicted. For example, a user's eye gaze in the right direction may lead to entry of a character select the right-most quadrant 106 of the E-tran board 100 shown in FIG. 1A. The characters in the right most quadrant may be ranked based upon a likelihood of use. For example, the probability that a word beginning with an "M" is substantially more likely than a word beginning with a "Q." At step 580, the predicted character may be entered as part of a text-based message. Thus, among the characters in the indicated quadrant and a ranking, a character may be temporarily entered into a text field that is displayed on a screen of an electronic device. For each letter that the user seeks to enter, the prediction can update the prediction of characters entered. Because the disclosed implementations require only a single eye gaze to indicate a character, a user can perform a sequence of eye gazes to spell a particular word where each eye gaze is associated with one character.

Figure 6A:
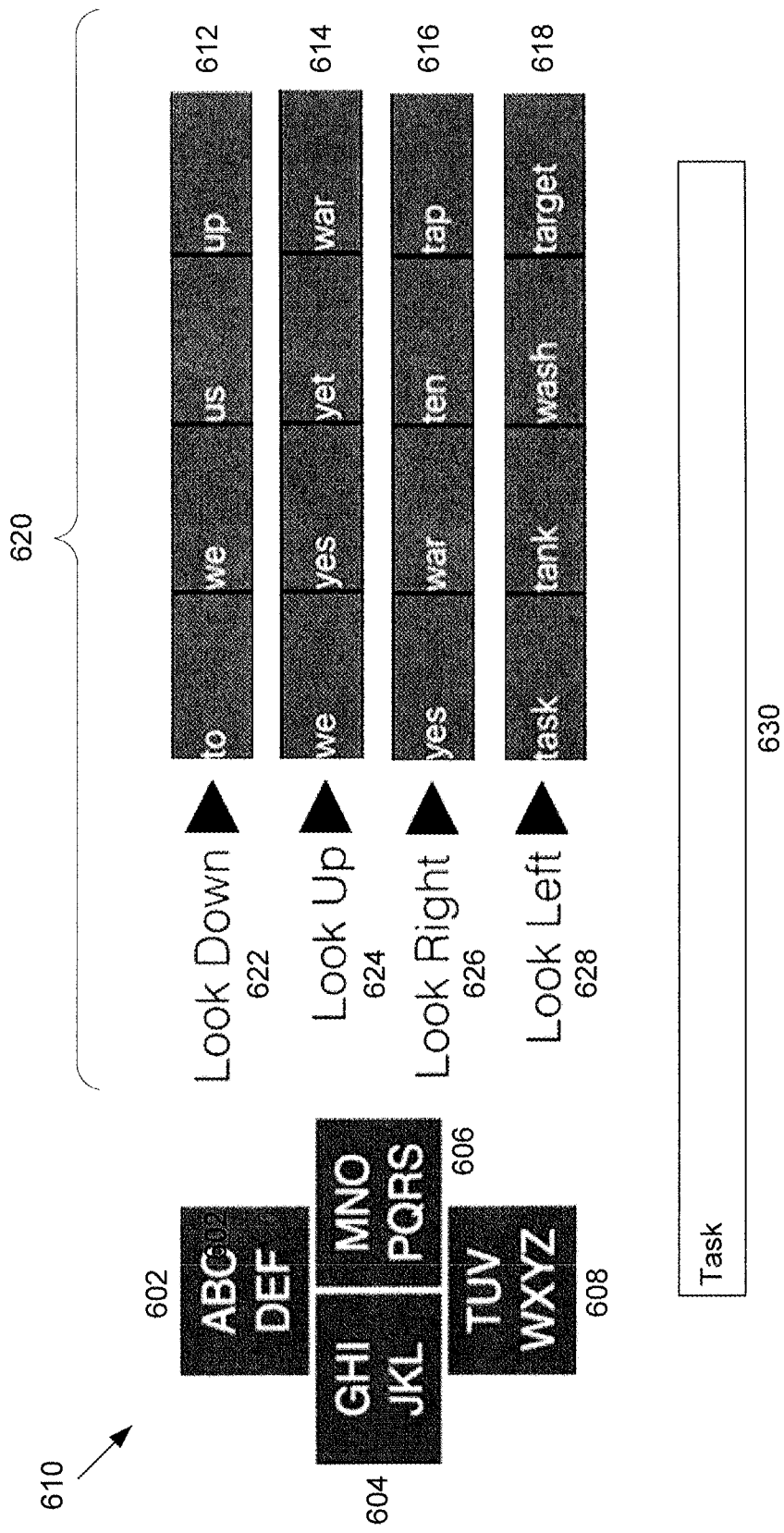
FIG. 6A is an example of text entry via a user interface according to an implementation.

Returning to FIG. 2, the second feature of the disclosed system is word prediction 220. To avoid fatigue of making complex eye gestures, improve learnability, and improve recognition rates, the disclosed system can use a small number of simple eye gestures (up/down/left/right) to refer to all 26 letters in the English alphabet, using only one gesture per character entered (to reduce fatigue and increase throughput). The disclosed design can provide for an ambiguous keyboard in which the letters of the alphabet are clustered into four groups that can be indicated with the up, down, left, or right gestures as shown in FIGS. 1 and 6A at 100, 610. The system may utilize a word prediction algorithm to predict what word the user is attempting to spell. For example, the word prediction algorithm may utilize the most common words in a dictionary, or commonly used words. A predicted word can be displayed on a screen that is visible to the communication partner. The word predictions can be updated based upon subsequently received information. For example, if the user performs a subsequent eye gaze, if the user indicates that an incorrect character has been entered and gestures the system to delete that character (e.g., with an eye wink), or if the user indicates that there are no additional characters to enter (e.g., by closing eyes).

FIG. 2 indicates that the final stage of the disclosed implementations is a text entry interface 230. The text entry interface 230 is not limited to any particular configuration. FIG. 6A is an example of an E-tran board 610 along with an example of the word prediction interface based on a sequence of eye gestures 620. The E-tran board has four quadrants 602, 604, 606, and 608, and each quadrant has a collection of letters (e.g., characters). A calibration template for the user for this E-tran board 610 shown in FIG. 6A may be established by performing the calibration template generation process described above. A communication partner may initiate the text entry process by launching an application that directs hardware of an electronic device to perform the process described with respect to FIG. 5. The process in FIG. 5 may be repeated until, for example, a word is entered or selected by the communication partner or by the user (e.g., via an eye gesture such as a wink or closed eyes).

A predictive text algorithm can be utilized to determine possible words that could be created with the letters in the quadrants indicated by a gesture sequence. As an example, the disclosed system can use a trie data structure to store common words and their frequencies in oral English. The most common 5000 words (frequency min=4875, max=22, 038,615, mean=12,125) from this wordlist can be selected. The communication partner can extend the trie to add the user's frequently-used words (including words not in the dictionary such as a name). For a series of eye gestures with length n, the trie structure can rapidly determine matching words and word frequencies in O(n) time. For a series of eye gestures, the disclosed system can also look up high frequency words whose initial characters match the gesture sequence thus far. A list of likely words based on the current gesture sequence can be displayed on a screen of an electronic device (e.g., a smartphone) for the communication partner. The number of words displayed can be varied. As an example, in FIG. 6A, each line of words predicted in the sequence 612, 614, 616, 618 shows the top four words predicted. Additional predictions may be viewed by horizontal/vertical scrolling. These prediction and auto-complete features can assist the communication partner in predicting possible words while the user is still entering text. This can improve throughput of the text entry, and ease the interpretation burden that is present in using a low-tech E-tran boards.

In the example sequence of eye gazes in FIG. 6A, a user may look down 622, look up 624, look right 626, and then look left 626. As the user performs the sequence of four eye gazes shown in FIG. 6A, the system can determine a character that corresponds to a quadrant in the direction of the eye gaze as described above. Thus, each word shown in the line at 612 begins with a letter in the "down" quadrant 608. At line 614, the user has performed two eye gazes in succession. The second eye gaze is associated with the "up" quadrant 602. The word prediction algorithm can display, for example, the most likely words that begin with a letter from the first indicated quadrant and have a second letter from the second indicated quadrant. The process of entering characters and updating the list of displayed words can proceed until an indication is received that the user has finished entering characters (e.g., spelling a word) or that the correct word has been predicted. A communication partner may speed up the selection of words if it becomes clear to the communication partner which word the user intends to spell. For example, the user interface may provide a touch interface that allows the communication partner to tap one of the words displayed on the screen. The electronic device may speak the selected word. Similarly, in the event that the system cannot detect a user's eye gaze (e.g., due to low light) or incorrectly detects the user's eye gaze, if the communication partner observes the user's eye gaze, the communication partner can select the appropriate character or word.

As illustrated in the example shown in FIG. 6A, in order to enter the word "TASK," the speaker first looks down for "T," then looks up for "A," looks right for "S," and looks left for "K." The predictions after each eye gesture in this sequence 622, 624, 626, 628 are shown in FIG. 6. To make it easier for the speaker to learn the gesture direction associated with a given letter, the four groups in the example E-tran board 610 shown in FIG. 6A are in alphabetical order. As stated above, an alternative letter/character grouping may reduce the conflict rate for word prediction. Similarly, the number of quadrants, and therefore the number of detectable eye gaze directions, can be varied. An E-tran board with fewer quadrants may improve learning how to operate the disclosed system. For example, the word prediction conflict rate is reasonably low for the E-tran board 610 shown in FIG. 6.

The disclosed implementations, using the eye gaze board shown in FIG. 1A or 6, were tested on twelve participants (five males and seven females, six individuals without glasses (e.g., with normal uncorrected vision), one individual with contact lenses, and five individuals with frame glasses, all individuals were of ages 20 to 44). Participants had varied skin and eye color. During the study, each participant performed each of an up, down, left, right, close, and center eye gesture 30 times. After each gesture, the participant was instructed to look back to center. Each participant recorded 300 eye gazes for testing plus an additional 150 gazes toward the center. The results of the test are summarized in Table I below:

TABLE 1

Recognition rate for each eye gesture

|  | Up | Down | Left | Right | Close | Center |
|---|---|---|---|---|---|---|
| Mean | 88.6% | 75.3% | 87.8% | 86.9% | 77.5% | 98.6% |
| Stdev | 5.2% | 17.5% | 4.8% | 7.4% | 13.5% | 1.8% |

Stdev = standard deviation.

In general, the percentage shown for "Mean" is the disclosed implementation's recognition rate for each indicated eye gesture.

The overall accuracy of the disclosed system is 86% of all eye gestures (min.=68%, max.=92%, med.=89%, stdev=6.9%). The center gesture was recognized with near perfect accuracy, while the other eye gestures had a high level of accuracy. Looking down and eyes closed were the most difficult gestures to distinguish, which is expected based on their similar appearance (see, e.g., FIG. 3B). The accuracy of the system was consistent irrespective of age, gender, eye color, or skin color. While the use of contact lenses did not appear to have an effect on the accuracy of recognition (89.7% accuracy for the one participant with contact lenses), the use of glasses significantly lowered the recognition accuracy to 80.4% (t(9)=2.714, p=0.024). The use of glasses may interrupt facial landmark alignment, which can cause a mislabeling of the eye area.

In testing with subjects using the disclosed system and the E-tran board as shown in FIG. 6A, 3248 unique eye gesture sequences matched 5000 words in the trie. 83.5% of sequences matched a unique word, 92.6% matched two or fewer words, 97.7% matched four or fewer words, 99.2% matched six or fewer words, and 99.6% matched 8 or fewer words. Thus, the disclosed system achieves high accuracy despite using a single eye gaze per character and relatively common hardware (e.g., a smartphone or tablet).

As described earlier, the disclosed system can successfully operate under a variety of lighting conditions, including indoors and outdoors. A calibration template can be established for each particular lighting condition. In addition, in low light conditions, for example, the system can activate the electronic device's camera light (e.g., flashlight), if such hardware exists, to make the user's face visible. To avoid flash burn to the user's eyes, a diffuser such as tape can be placed over the light. A lighting condition can be determined by detecting an amount of light received by the camera. The system may determine that a low amount of light is present. For example a low lighting condition may correspond to less than 50 lux. Normal lighting may refer to greater than 100 lux.

In an implementation, the disclosed system can adapt to two major transformations: it can adapt to scale and to translation. Scale can refer to an instance where the communication partner moves phone closer to the user. Translation can refer to an instance where the head of the user is moved slightly, or where the communication partner moves the electronic device (e.g., phone or camera) while holding it. The disclosed can also adapt to the combination of scale and translation such as when the communication partner sets the electronic device down, and later holds it in a slightly different position.

Figure 6B:
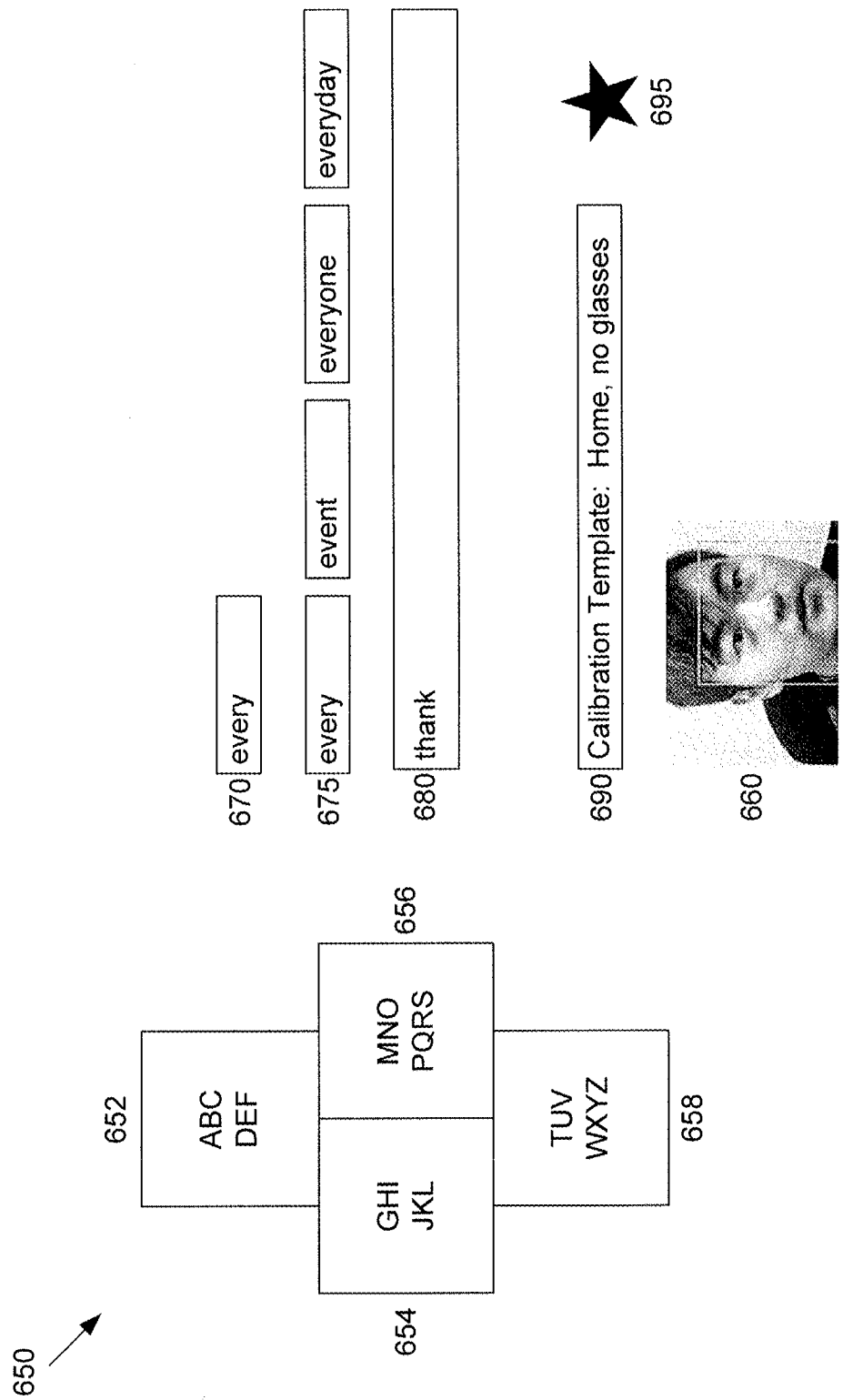
FIG. 6B illustrates another example of the user interface according to an implementation disclosed herein.

The last feature shown in FIG. 2 is text entry via a user interface 230. FIGS. 6A and 6B provide examples of an interface from which predicted words can be selected from a list. The user and communication partner can use different interfaces. The user, for example, can see the back of the electronic device such as a smartphone. Thus, a text entry interface without a screen can include two components: a sticker displaying the four quadrant-containing E-tran board (or the like), and an audio feedback. The communication partner, in this example, can see the smartphone screen, which can display three components: the four quadrant-containing E-tran board, a word prediction sequence (see, for example, 620), and the text input box (see, for example, 630).

As the user begins to enter one character, the user can perform eye movements in the direction associated with a character in a given quadrant. In an implementation, once the system detects that the eyes have settled in one direction, it can speak aloud the direction it detected (e.g., "Up"). The user can then perform an eye movement to enter the next character. When user mistypes or hears feedback indicating an incorrect gesture recognition, the user can perform another gesture such as a left eye wink, to delete the word. Other gestures may be utilized including closing eyes for a specified period of time. If the user directs the system to delete the last character with a gesture, the system can remove the last character from the current sequence and/or update the predicted words. When the user finishes a sequence for an entire word, the user can perform another gesture such as winking a right eye or looking at the center of the board for a predetermined amount of time (e.g., two seconds), to indicate the end of the word. The system can speak aloud the first word prediction based on the series of eye gestures. The speaker can confirm this prediction by performing an eye gesture, such as winking the right eye again, to confirm the prediction. As another example, the user can perform a gesture to hear the next word prediction. After a word has been confirmed, the word can be added to the sentence being constructed in the text input box. After the user confirms the last word of the sentence, the user can perform a gesture to indicate the end of the sentence such as a right eye wink again. In response to the received eye gesture, the system can play aloud the completed sentence.

With information displayed on the screen of an electronic device, the communication partner can speed up the communication process. The text input box can show the most likely word(s) based on the current gesture sequence, and the length of the word can also indicate the number of eye gestures performed in the current sequence. Even before the user finishes a word, if the communication partner observes a likely word prediction based on context of the sentence and/or familiarity with the user, the communication partner can, for example, say the word aloud or tap the prediction box to have the system play the word aloud. The user can confirm or reject the prediction by performing an eye gesture such as by winking the right eye to confirm the entry or winking the left eye to reject the entry. The present disclosure is not limited to the eye gestures specifically mentioned herein. Other motions can be incorporated into the present implementations to account for the varying range of mobility of the user. Examples of other motions that can be utilized in lieu of or in addition to eye gestures include head movements such as a nod, eye brow movement, etc. If the communication partner received confirmation from the user, the communication partner can add the word to the sentence box, for example, by performing a long-press (e.g., at least two seconds) of the word. The user can proceed to begin a gesture sequence for the next word in the sentence. If the user rejects the prediction of the communication partner, the user can continue to make eye gestures to complete the word. Once the user indicates the end of the sentence, the communication partner can confirm the sentence with the user by saying the sentence aloud or touching the text input box which may prompt the system read the sentence aloud.

FIG. 6B illustrates another example of the user interface according to an implementation disclosed herein. In this example, the eye gaze board 650 is a four quadrant 652, 654, 656, 658 board with the alphabet distributed among the four quadrants 652, 654, 656, 658. A face of the user 660 is shown with a face recognition box. The user interface 650 can display the top overall word predicted 670 based on the current sequence of eye gestures. The top four word predictions 675 are also displayed in a line. The system may visually indicate the current focus by changing the current word a different color. A user may select a different predicted word by performing an eye gesture (e.g., look right) and the system may indicate the next word by speaking the word and/or visually indicating the selection. The number of words shown can be varied, and each word can be selected to speed up communication. A text input box 680 can display the prior words in the communication exchange. When the user indicates the end of a word (e.g., by winking), the system may "speak" the word. The word can be added to the text input box. After the user confirms the last word of the sentence, the system may play aloud the entire sentence and the user may indicate whether the sentence is correct or needs to be edited. Finally, the user interface may display the currently selected calibration template 690. A different template may be chosen if desired, such as by selecting the "configuration" button 695.

A lab-based usability study was conducted to gauge the relative performance, usability, and user preference for the disclosed implementations. The study involved ten pairs of randomly selected, able-bodied individuals who did not have prior E-tran board experience. The average age of participants was 32 (min.=20, max.=52); fourteen participants were male and six were female. Each person was randomly assigned the role of either the user or the communication partner. Among those selected to be a user, five had normal (uncorrected) vision, two wore contact lenses, and three wore glasses. For input methods requiring both participants, the participants sat approximately 0.5 m apart facing each other in chairs. A Latin Square Design was utilized to counterbalance the ordering of the three input methods across participant pairs. The sentences to be entered during testing were a randomly selected set of eighteen five-word-long sentences (29-31 characters each) from the Mackenzie and Sourkeroff phrase sets commonly used for evaluating text entry techniques.

The user preference among three input or communication methods was examined. The three input methods were: (1) a conventional E-tran board, (2) an implementation of the disclosed system operating on a smartphone in which the rear camera faced the user, and the front camera/display of the device faces the communication partner (e.g., as illustrated in FIG. 6A), and (3) an implementation of the disclosed system in which the user operates the electronic device independent of a communication partner (e.g., as illustrated in FIG. 6B). In the third input method, the electronic device (a smartphone in this case) is positioned in a stand such that a camera and the display face the user (e.g., the user sees the display). The speaker performs eye gestures as described above in this input method and indicates the end of a word (e.g., by winking). In addition to playing the completed word aloud, the system can visually indicate the first predicted word (e.g., by changing the color of the word) to indicate the current focus. The user can perform a subsequent eye gesture to hear the next predicted word and the visual focus may switch to that prediction.

For each of the three input methods, participants were provided a brief tutorial on how to use the communication method, and the pair was allowed to practice until they felt comfortable using the method to communicate a two-word example utterance (e.g., "hello world"). A sentence from the testing corpus was privately shared with the user, and the user was instructed to communicate that sentence as quickly and accurately as possible to the communication partner without speaking and using only the current input method. The time from when the user was told to communicate the sentence until the when the communication partner correctly decoded the sentence was recorded. This procedure continued until either six sentences had been successfully communicated or ten minutes had elapsed, at which point the session was halted in order to avoid excessive fatigue. Participants then completed a short questionnaire providing feedback about their experience using the current input method, and took a short break if they felt fatigued. After repeating this procedure for all three communication methods, participants completed a final questionnaire ranking their preferences among all three methods.

For each 10-minute session using a given communication method, the user was asked to communicate six sentences individually or to the communication partner. Using the disclosed implementations (i.e., input methods 2 and 3), all pairs successfully communicated all six phrases. However, using the conventional E-tran method, pairs completed an average of 4 phrases. These data are summarized in Table 2 below:

TABLE 2

The time (in seconds) used to complete a sentence for each input method

|  | Mean | Median | Min. | Max. | Stdev. |
| --- | --- | --- | --- | --- | --- |
| Input method 1 | 1434 | 122.5 | 72 | 298 | 57.4 |
| Input method 2 | 80.9 | 77.5 | 51 | 132 | 18.8 |
| Input method 3 | 77.1 | 76 | 56 | 120 | 11.5 |

Participants, on average, used 137.8 seconds to complete a sentence using the conventional E-tran board (input method 1), 80.9 seconds using a first implementation disclosed herein (input method 2), and 77.1 seconds using a second implementation disclosed herein (input method 3). A oneway Analysis of Variance (ANOVA) with repeated measures indicated that the mean input time differed significantly between input methods (F(1.067, 9.602)=21.032, p=0.002). Pairwise paired-samples t-tests show that both of the tested implementations delivered a statistically significant reduction in input time as compared to the conventional E-tran board (Input method 2 vs. Input method 1: t(9)=4.136, p=0.003; Input method 3 vs. Input method 1: t(9)=3.983, p=0.003).

The questionnaires completed after each input method was performed asked participants to indicate their level of agreement with several statements about that condition's input method on a 5-point Likert scale (Table 3).

TABLE 3

The user's (U) and communication partner's (C) average agreement level (1 = strongly disagree, 5 = strongly agree) on each statement.

|  | Input method 1 | | Input method 2 | | Input method 3 | |
| --- | --- | --- | --- | --- | --- | --- |
|  | U | C | U | C | U | C |
| I feel it is unnecessarily complex | 2.9 | 2.4 | 1.7 | 1.7 | 1.6 | 2.1 |
| I feel confident to use it | 3.0 | 3.3 | 4.3 | 4.3 | 4.3 | 3.8 |

The Friedman test indicates there were statistically significant differences in perceived complexity between the tested input methods ($\chi^2$=8.5, p=0.014). A Wilcoxon signed-rank test shows that Input method 2 has a statistically significant reduction in perceived complexity over Input method 1 (Z=−2.834, p=0.005). There were no significant differences between Input methods 2 and 3 (Z=0.612, p=0.541), or between Input method 1 and Input method 3 (Z=−1.794, p=0.073). A Friedman test also indicates there were statistically significant differences in perceived confidence in correctly communicating using each input methods ($\chi^2$=7.4, p=0.024). Participants reported feeling more confident using Input methods 2 and/or 3 as compared to Input method 1 (Input method 2 vs. Input method 1: Z=−2.871, p=0.004; and Input method 3 vs. Input method 1: Z=−1.970, p=0.049).

The study questionnaires also included items from the National Aeronautics and Space Administration Time Load Index (NASA TLX) scale, reported on a 7-point scale (Table 4).

TABLE 4

The user's (U) and communication partner's (C) average ratings (1 = very low, 7 = very high) for NASA TLX items.

|  | Input method 1 | | Input method 2 | | Input method 3 | |
| --- | --- | --- | --- | --- | --- | --- |
|  | U | C | U | C | U | C |
| Mentally Demanding | 4.8 | 4.5 | 3.3 | 2.5 | 3.4 | 2.6 |
| Task Difficulty | 3.9 | 3.5 | 2.4 | 2.4 | 3.1 | 1.9 |
| Feel Stressed/Discouraged | 3.9 | 2.2 | 2.1 | 1.9 | 2.4 | 1.8 |

Participants rated Input method 1 as more mentally demanding than Input methods 2 and/or 3 (Friedman test: $\chi^2$=13.5, p=0.001, Input method 2 vs. Input method 1: Z=−3.471, p=0.001; and Input method 3 vs. Input method 1: Z=−2.774, p=0.006). Compared to Input method 1, Input methods 2 and 3 were considered less difficult to use (Friedman test: $\chi^2$=7.0, p=0.03, Input method 2 vs. Input method 1: Z=−2.560, p=0.01; and Input method 3 vs. Input method 1: Z=−1.930, p=0.05). Participants indicating feeling less stressed or discouraged when using Input method 3 as compared to Input method 1 (Z=−1.951, p=0.05). For users, using Input method 2 significantly reduced feelings of stress and discouragement compared to using Input method 1 (Z=−2.328, p=0.02).

After completing all sessions, participants ranked all three Input methods based on their experience (Table 5). Overall, participants preferred Input methods 2 and 3 over Input method 1. Input method 1 was not selected by any participants as their favorite input method. A one-sample chi-square test showed a significant difference in the rankings of preferences for each system, with Input method 1 most likely to be ranked as the least favorite by all participants, regardless of role ($\chi^2$(1, N=20)=9.80, p=0.002).

TABLE 5

The user's (U) and communication partner's (C) average rank (1 = best, 3 = worst)

|  | Input method 1 | | Input method 2 | | Input method 3 | |
| --- | --- | --- | --- | --- | --- | --- |
|  | U | C | U | C | U | C |
| Average Rank | 2.9 | 2.8 | 1.6 | 2 | 1.5 | 1.2 |

Communication partners favored Input method 3 as the top-ranked interface (likely because this mode resulted in less active communication partner involvement), $\chi^2$(1, N=10)=6.40, p=0.01, whereas participants in the user role were not significantly more likely to have a clear preference between Input method 2 or 3, $\chi^2$(1, N=10)=0.40, p=0.53.

Figure 7:
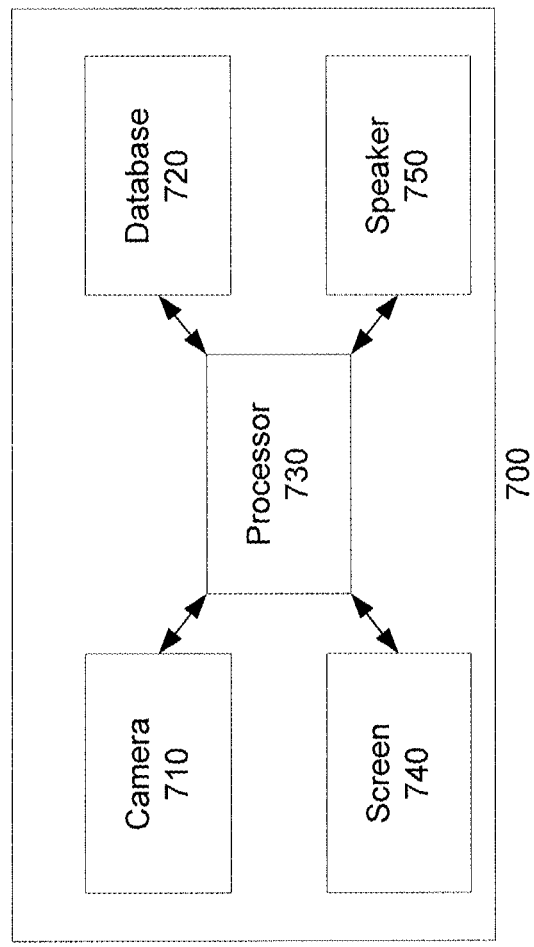
FIG. 7 is an example configuration of a system according to an implementation disclosed herein that includes a camera, a database, and a processor.

FIG. 7 is an example configuration of a system according to an implementation disclosed herein that includes a camera 710, a database 720, and a processor 730. These components can be integrated into a single device 700, or be in separate devices. For example, the camera 710 can be connected to the system as a peripheral device such as the remote camera. Similarly, the database 720 can be a remote database that stores, for example, the calibration template for the user. The camera 710 can be a red, green, blue ("RGB") camera typically found in most portable consumer devices (e.g., laptops, tablet, smartphone). The RGB camera may detect light in the visible light spectrum. The camera 710 can be an infrared camera as well be a hybrid RGB/IR camera. The camera 710, database 720, and processor 730 can be connected by a system bus and/or a network connection. The device can also include a screen 740, however a screen 740 to display information is not necessary. As described above, the device may utilize a speaker 750 to provide an audible indication of a character and/or word. Similarly, the device may emit a sound to provide direction such as during the calibration template generation to direct the user to look in a particular direction.

As described above, the camera 710 can capture at least one frame that includes a face of a user. As an example the camera may capture frames continuously. Each frame can be stored temporarily in the database. The database can refer to a short term memory such as random-access memory ("RAM") or a storage drive. The processor 730 may be communicatively coupled to the camera 710 and the database 720. The processor may be configured to receive an indication of the E-tran board configuration. For example the communication partner can select from a predetermined E-tran board configuration such as the example provided in FIG. 6A, or a customized E-tran board can be selected. Upon selection of the E-tran board configuration, the processor may begin analyzing the frames captured by the camera 710 that are stored in the database 720 as described earlier. For example, during text-based message entry, each frame captured may be analyzed to detect a face using a face detection algorithm.

The processor 730 may be configured to align landmarks to the face in each captured frame. A left eye image and a left eye image may be extracted. In configurations where landmarks are aligned to the detected face, the left eye image and/or right eye image may be extracted based upon the aligned landmarks for each frame. Each of the left eye image and/or the right eye image extracted from a frame can be resized to a size matching one of a set of calibrated left eye images and/or a set of calibrated right eye images. The processor can compare the resized left eye image to the calibrated set of left eye images as described above. Similarly, the processor can compare the resized right eye image to the set of left eye images as described above.

As an example, a given eye gaze gesture may be performed or detected within a ten frames. Ten frames for each eye, therefore, may be captured and compared to the respective calibrated set of images for a given eye. The comparison of a frame to an image from the calibration template may be performed by, for example, MSE. Even if the user has not begun to gaze in a given direction at the start of capturing images, over the collected ten frames for each eye in this example, the majority are likely to be more similar to the eventual eye gaze direction of the user. The system may include a threshold level value for MSE, above which a match is determined not to exist to the given direction of eye gaze for a calibrated image. Thus, if 12 of the 20 resized images indicate a "right" eye gaze, then the direction of eye gaze can be determined as "right."

The processor 730 can predict a character based upon the comparison of the resized image to the calibrated set based upon the determined direction of eye gaze by the user and the known configuration of the E-tran board. In some configurations, the system may emit a sound through the speaker 750 to indicate the determined direction of eye gaze, the predicted character, and/or the predicted word. As another example, the screen 740 may provide a visual indication of the determined direction of eye gaze (e.g., by highlighting the quadrant of the E-tran board such as the one shown in FIG. 6), by displaying the predicted character, and/or by displaying the predicted word. The system may receive confirmation of the predicted character and/or word by detecting an eye gesture of the user such as a wink, closed eyes, center gaze, head movement, etc. The predicted character may be included as part of a text based message. As described above, the processor 730 may be configured to display the word in a text input box on the screen 740.

In some configurations, the system may utilize two devices, such as two smartphones. In such a configuration, the screen of a first smartphone may face the communication partner while the screen of the second device may face the user. The camera on the second electronic device facing the user may be utilized to capture frames of the user. The screen of the second electronic device may display the E-tran board, as well as other information such as the text input box and/or the character and/or word predictions. The screen of the first electronic device may display the E-tran board, the predicted character, and/or word, and/or the text input box. In some configurations, the communication partner and the user may be located in separate locations. The user may have an electronic device that includes at least a camera, processor, database, and speaker. The electronic device may be positioned to capture the face of the user. The camera images can be stored on the electronic device or to a remote location for analysis. The result of the analysis (e.g., direction of eye gaze and/or predicted character and/or word) may be provided to the communication partner's device and/or the user's device. The communication partner can interact with the system as described above. Thus, the system does not require the communication partner and the user to be collocated. As an example, such an implementation can allow remote communication over a video chat application or the like.

Figure 8:
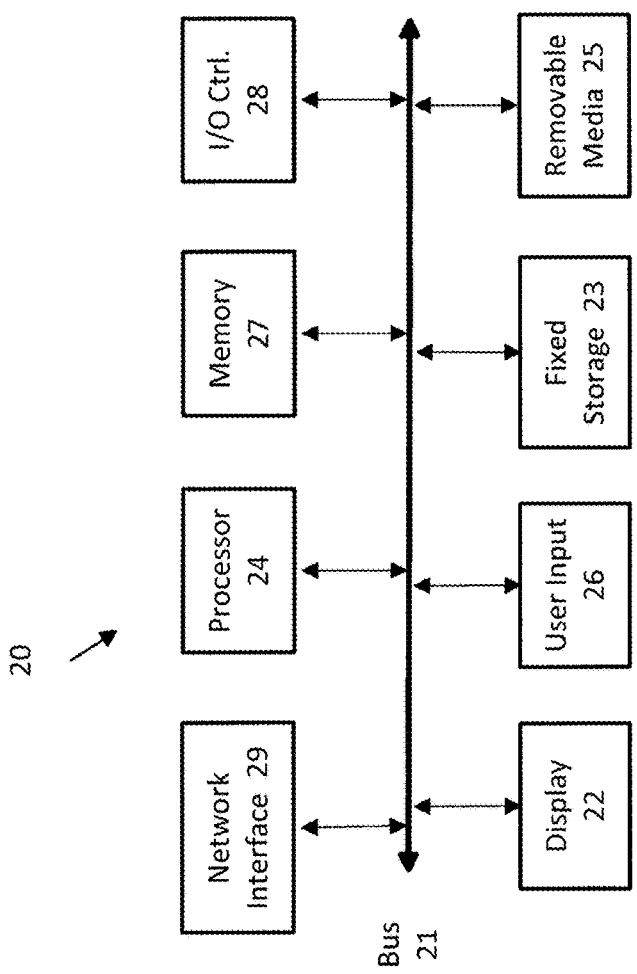
FIG. 8 is an example computer (e.g., electronic device such as a smartphone, tablet, laptop, personal computer, etc.) suitable for implementing embodiments of the presently disclosed subject matter.

Embodiments of the presently disclosed subject matter may be implemented in and used with a variety of component and network architectures. FIG. 8 is an example computer 20 (e.g., electronic device such as a smartphone, tablet, laptop, personal computer, etc.) suitable for implementing embodiments of the presently disclosed subject matter. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
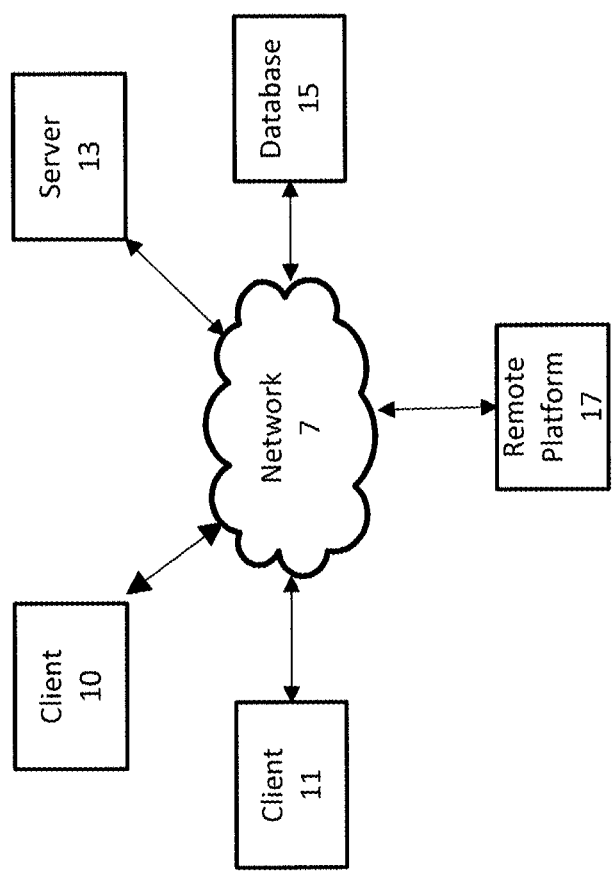
FIG. 9 shows an example network arrangement according to an embodiment of the disclosed subject matter.

FIG. 9 shows an example network arrangement according to an embodiment of the disclosed subject matter. One or more clients 10, 11, such as local computers, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
   A rear camera of a mobile device configured to capture at least one frame that includes a face of a user;
   a database configured to store the at least one frame;
   a processor communicatively coupled to the rear camera and the database, the processor configured to:
      detect the face in the captured at least one frame;
      extract a left eye image and a right eye image of the face from the at least one frame;
      resize the left eye image to a size matching one of a calibrated set of left eye images for the user and the right eye image to a size matching one of a calibrated set of right eye images for the user;
      compare the resized left eye image to the calibrated set of left eye images for the user, wherein each image in the calibrated set of left eye images corresponds to a known eye gaze direction for a left eye of the user;
      compare the resized right eye image to the calibrated set of right eye images for the user, wherein each image in the calibrated set of right eye images corresponds to a known eye gaze direction for a right eye of the user;
      determine a direction of eye gaze based upon the comparison of the resized left eye image to the calibrated set of images for the left eye and the comparison of the resized right eye image to the calibrated set of images for the right eye;
      identify, based upon the determination of the direction of eye gaze and a known configuration of an eye gaze board having a plurality of quadrants, a quadrant of the eye gaze board corresponding to the direction of eye gaze, wherein each of the plurality of quadrants of the eye gaze board comprise at least one character; and
      display the at least one character from the quadrant as a part of a text-based message.

2. The system of claim 1, the processor is further configured to generate the calibration template comprising the calibrated set of left eye images and the calibrated set of right eye images, comprising:
   receive an indication of eye gaze of the user in a direction;
   receiving a second at least one frame of the user that is captured from the rear camera;
   detect the face of the user in the second at least one frame;
   extract a calibrated left eye image and a calibrated right eye image of the face from the second at least one frame; and
   store the calibrated left eye image and the calibrated right eye image to the database as part of the calibration template for the direction of eye gaze.

3. The system of claim 2, the processor further configured to:
   determine lighting condition based on an amount of light detected by the rear camera; and
   associate the lighting condition with the calibration template.

4. The system of claim 1, the processor further configured to:
   based upon the at least one character in the quadrant, determine at least one word associated with the at least one character using a predictive text algorithm that determines words based upon frequency of usage.

5. The system of claim 4, the processor further configured to:
align landmarks to the face in the captured at least one frame.

6. The system of claim 1, the processor further configured to:
cause an audible or visible indication of the at least one character.

7. The system of claim 1, the processor further configured to:
receive a gesture from the user; and
perform an action based upon the gesture.

8. The system of claim 7, wherein the action is to delete the at least one character from the text-based message.

9. The system of claim 1, the processor further configured to:
convert the left eye image to hue, saturation, and value (HSV) color space and retain only the value portion; and
convert the right eye image to HSV color space and retain only the value portion.

10. The system of claim 1, the processor further configured to:
receiving a plurality of eye gazes from the user to form a sequence of eye gazes; and
predicting a word based upon the sequence of eye gazes using a predictive text algorithm.

11. A computer-implemented method, comprising:
capturing, by a rear camera of a mobile device, at least one frame that includes a face of a user;
detecting the face in the captured at least one frame;
extracting a left eye image and a right eye image of the face from the at least one frame;
resizing the left eye image to a size matching one of a calibrated set of left eye images for the user and the right eye image to a size matching one of a calibrated set of right eye images for the user;
comparing the resized left eye image to the calibrated set of left eye images for the user, wherein each image in the calibrated set of left eye images corresponds to a known eye gaze direction for a left eye of the user;
comparing the resized right eye image to the calibrated set of right eye images for the user, wherein each image in the calibrated set of right eye images corresponds to a known eye gaze direction for a right eye of the user;
determining a direction of eye gaze based upon the comparison of the resized left eye image to the calibrated set of images for the left eye and the comparison of the resized right eye image to the calibrated set of images for the right eye;
identifying, based upon the determination of the direction of eye gaze and a known configuration of an eye gaze board having a plurality of quadrants, a quadrant of eye gaze board corresponding to the direction of eye gaze, wherein each of the plurality of quadrants of the eye gaze board comprise at least one character; and
displaying the at least one character from the quadrant as a part of a text-based message.

12. The method of claim 11, further comprising generating the calibration template comprising the calibrated set of left eye images and the calibrated set of right eye images, comprising:
receiving an indication of eye gaze of the user in a direction;
capturing a second at least one frame of the user,
detecting the face of the user in the second at least one frame;
extracting a calibrated left eye image and a calibrated right eye image of the face from the second at least one frame; and
storing the calibrated left eye image and the calibration right eye image as part of the calibration template for the direction of eye gaze.

13. The method of claim 12, further comprising:
determining lighting condition based on an amount of light detected by the rear camera; and
associating the lighting condition with the calibration template.

14. The method of claim 13, further comprising:
based upon the at least one character in the quadrant, determining at least one word associated with the at least one character using predictive text algorithm that determines words based upon frequency of usage.

15. The method of claim 14, further comprising:
receiving a selection of at least one word associated with the at least one character.

16. The method of claim 11, further comprising:
generating an audible or visible indication of the at least one character.

17. The method of claim 11, further comprising:
receiving a gesture from the user; and
performing an action based upon the gesture.

18. The method of claim 11, further comprising:
converting the left eye image to hue, saturation, and value (HSV) color space and retain only the value portion; and
converting the right eye image to HSV color space and retain only the value portion.

19. The method of claim 11, further comprising:
receiving a plurality of eye gazes from the user to form a sequence of eye gazes; and
predicting a word based upon the sequence of eye gazes using a predictive text algorithm.

20. A non-transitory computer readable medium having stored thereon computer readable instructions that are executable to cause one or more processors to perform operations, comprising:
capturing, by a rear camera of a mobile device, at least one frame that includes a face of a user;
detecting the face in the captured at least one frame;
extract a left eye image and a right eye image of the face from the at least one frame;
resizing the left eye image to a size matching one of a calibrated set of left eye images for the user and the right eye image to a size matching one of a calibrated set of right eye images for the user;
comparing the resized left eye image to the calibrated set of left eye images for the user, wherein each image in the calibrated set of left eye images corresponds to a known eye gaze direction for a left eye of the user;
comparing the resized right eye image to the calibrated set of right eye images for the user, wherein each image in the calibrated set of right eye images corresponds to a known eye gaze direction for a right eye of the user;
determining a direction of eye gaze based upon the comparison of the resized left eye image to the calibrated set of images for the left eye and the comparison of the resized right eye image to the calibrated set of images for the right eye;
identifying, based upon the determination of the direction of eye gaze and a known configuration of an eye gaze board having a plurality of quadrants, a quadrant of the eye gaze board corresponding to the direction of eye gaze, wherein each of the plurality of quadrants of the eye gaze board comprise at least one character; and displaying the at least one character from the quadrant as a part of a text-based message.

\* \* \* \* \*